(12) United States Patent
Reuss et al.

(10) Patent No.: US 9,590,680 B1
(45) Date of Patent: Mar. 7, 2017

(54) DON DOFF CONTROLLED HEADSET USER INTERFACE

(75) Inventors: Edward L. Reuss, Santa Cruz, CA (US); Diane Elabidi, Scotts Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 2376 days.

(21) Appl. No.: 11/895,054

(22) Filed: Aug. 22, 2007

(51) Int. Cl.
*H04M 1/00* (2006.01)
*H04B 1/3827* (2015.01)
*H04M 1/60* (2006.01)

(52) U.S. Cl.
CPC ........... *H04B 1/385* (2013.01); *H04M 1/6066* (2013.01)

(58) Field of Classification Search
USPC ........................................ 455/575.2; 379/430
See application file for complete search history.

(56) References Cited

U.S. PATENT DOCUMENTS

| | | | |
|---|---|---|---|
| 3,109,893 A | 11/1963 | Burns et al. | |
| 4,330,690 A | 5/1982 | Botros | |
| 5,576,500 A * | 11/1996 | Cage et al. | 73/861.357 |
| 6,272,361 B1 * | 8/2001 | Courtis et al. | 455/569.1 |
| 6,518,957 B1 * | 2/2003 | Lehtinen et al. | 345/173 |
| 6,529,713 B1 * | 3/2003 | Seymour | 455/575.2 |
| 6,704,428 B1 | 3/2004 | Wurtz | |
| 6,965,669 B2 | 11/2005 | Bickford et al. | |
| 7,010,332 B1 * | 3/2006 | Irvin et al. | 455/575.2 |
| 2001/0044318 A1 * | 11/2001 | Mantyjarvi et al. | 455/550 |
| 2002/0021278 A1 | 2/2002 | Hinckley et al. | |
| 2002/0068537 A1 | 6/2002 | Shim et al. | |
| 2004/0105538 A1 | 6/2004 | Goebel | |
| 2004/0258253 A1 * | 12/2004 | Wurtz | 381/71.6 |
| 2005/0221791 A1 | 10/2005 | Angelhag | |
| 2006/0023865 A1 | 2/2006 | Nice et al. | |
| 2007/0042816 A1 * | 2/2007 | Chan | 455/575.1 |
| 2007/0076897 A1 | 4/2007 | Philipp | |
| 2007/0121959 A1 | 5/2007 | Philipp | |
| 2007/0281750 A1 * | 12/2007 | Cox et al. | 455/567 |
| 2008/0080705 A1 * | 4/2008 | Gerhardt et al. | 379/430 |
| 2008/0242378 A1 * | 10/2008 | Lowles et al. | 455/575.2 |

FOREIGN PATENT DOCUMENTS

| | | |
|---|---|---|
| EP | 0564164 | 10/1993 |
| GB | 2357400 | 6/2001 |
| JP | 2002-278785 | 10/2000 |
| WO | WO0076177 | 12/2000 |
| WO | WO0163888 | 8/2001 |
| WO | WO03103175 | 12/2003 |
| WO | WO2005099105 | 10/2005 |

OTHER PUBLICATIONS

Gregory, Peter; Doria, Tom; Stegh, Chris; Su, Jim; SIP Communications for Dummies, Avaya Custom Edition, 2006, Wiley Publishing, Inc., Hoboken, NJ, USA.

* cited by examiner

*Primary Examiner* — Golam Sorowar
(74) *Attorney, Agent, or Firm* — Chuang Intellectual Property Law

(57) ABSTRACT

A headset includes a detector providing an output indicating a donned or doffed condition and a processor for executing a user interface control application. The user interface control application enables or disables a user interface responsive to detection of the donned or doffed condition.

14 Claims, 15 Drawing Sheets

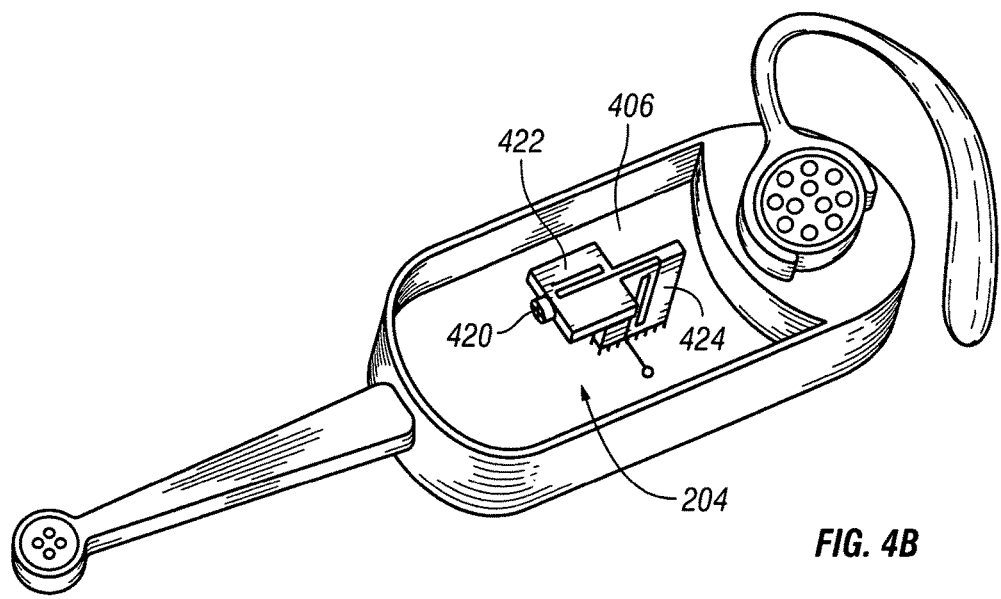
FIG. 4B
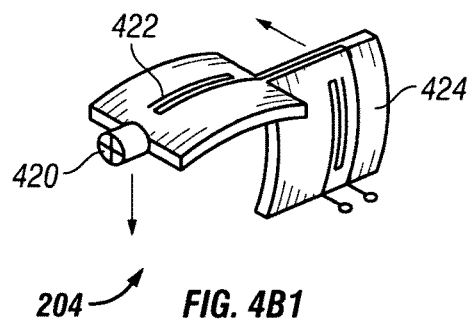
FIG. 4B1
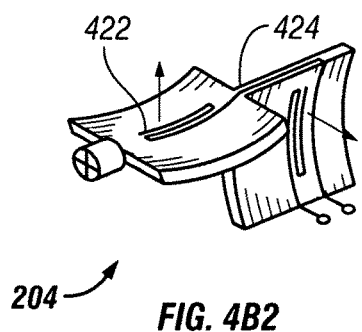
FIG. 4B2

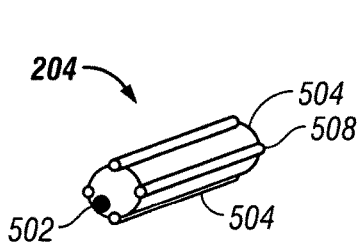
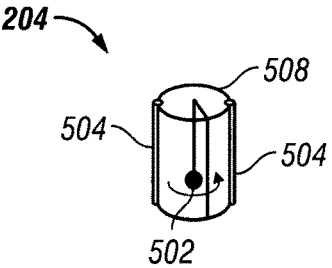
FIG. 5A                    FIG. 5B
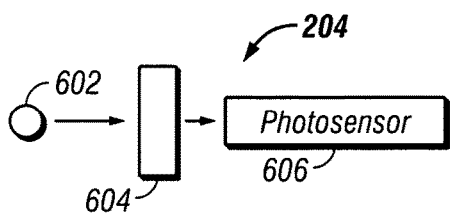
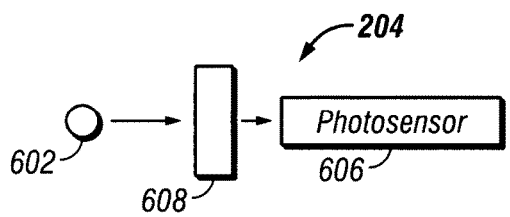
FIG. 6A                    FIG. 6B
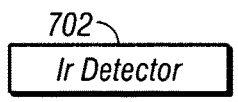
FIG. 7
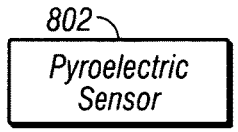
FIG. 8A

FIG. 8B
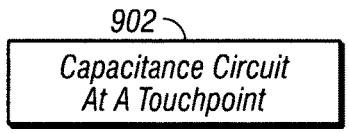
FIG. 9

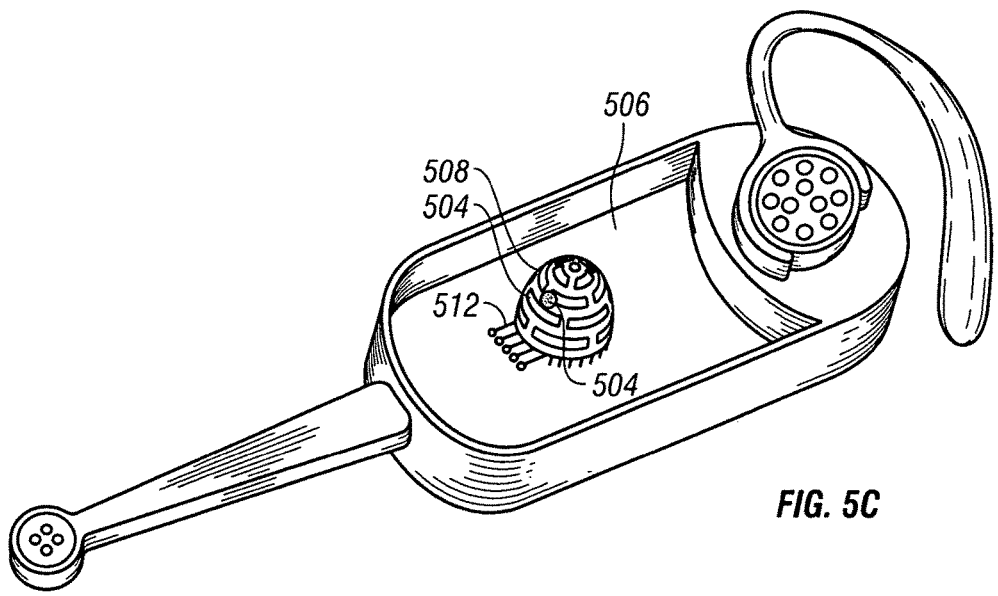
FIG. 5C
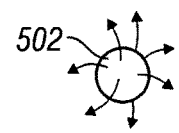
FIG. 5C1
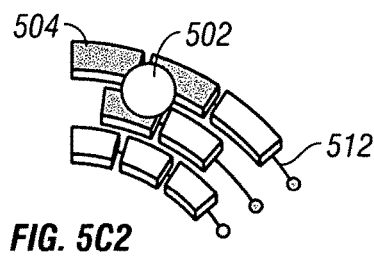
FIG. 5C2
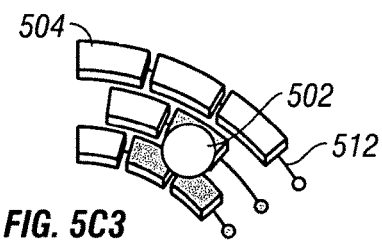
FIG. 5C3

DON DOFF CONTROLLED HEADSET USER INTERFACE

BACKGROUND OF THE INVENTION

Headsets include a variety of user interfaces to interact with users. For example, headsets may include various output indicators to convey information to the user, such as liquid crystal displays or light indicators. Headsets also include various means to receive user actions to operate the headset, such as buttons or keys.

Control and management of the headset user interface may pose a variety of problems. A headset with an integrated display consumes a significant amount of power for the display, particularly for the display backlight. When the user puts the headset on their ear, the display is effectively useless as it is no longer visible to the user. Although there are a few headsets which include a special jig to unfold into the user's field of view, many users find such headsets undesirable. In the prior art, headsets may use timers connected to the buttons to disable the display. However, the display is still on for several seconds after the headset is placed onto the user's ear, consuming valuable battery power.

Telephone headsets, which are small and lightweight, are often carried by users in a pocket or bag. Typical headsets include one or more user input buttons. When the headset is powered on, the user may perform a variety of functions by depressing or utilizing the user input buttons. However, when the headset is carried in a pocket or bag, inadvertent depressions of the user input buttons may occur. These inadvertent inputs may lead to undesired operation of the headset, including redialing of numbers or powering off of the headset. In addition to posing the potential for embarrassing calls, inadvertent inputs may also waste battery power.

As a result, there is a need for improved methods and apparatuses for headset user interface control.

BRIEF DESCRIPTION OF THE DRAWINGS

The present invention will be readily understood by the following detailed description in conjunction with the accompanying drawings, wherein like reference numerals designate like structural elements.

FIGS. 3 through 6 show different embodiments of a motion detector used in a headset.

FIGS. 7 through 13 show different embodiments of a non-motion detector used in a headset.

DESCRIPTION OF SPECIFIC EMBODIMENTS

Figure 1:
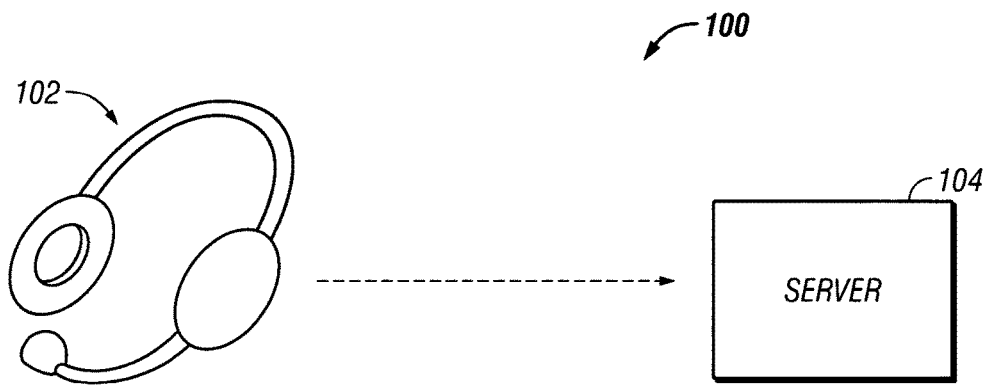
FIG. 1 shows a system including a headset server and a headset (wired or wireless) capable of indicating a donned or doffed state of the headset.

Methods and apparatuses for headset user interface control are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates generally to the field of headsets and specifically to the field of headset user interfaces. In one example, this description describes a method and apparatus for reducing power consumption of a wireless headset with an integrated display. The wireless headset includes both an integrated display and some form of Don Doff sensor with each used for ancillary functions in the headset. The Don Doff sensor is used to disable the display, either via dedicated hardware logic or via control software, whenever the Don Doff sensor indicates that the headset has been placed on the ear. Similarly, the control may automatically enable the display whenever the sensor determines that the headset has been removed from the ear. In the absence of any input from the user, such as pressing a key, the traditional display inactivity timer will disable the display once more after a predetermined period of inactivity. In a further example, this description describes and method and apparatus for reducing inadvertent operation of a wireless headset resulting from accidental depression of the headset user input devices.

The herein described methods and systems provide several advantages over the prior art. For a headset with an integrated display, since the display represents a large additional power drain on the headset battery, any strategy to minimize the time that the display is enabled increases the talk time and the standby time of the headset. If the display and the don doff detector are part of the headset for other purposes, then the incremental cost for this feature is virtually nil. Furthermore, Don Doff based locking of headset inputs may conserve battery talk time, wasted usage minutes or fees, and avoid potentially embarrassing moments.

In one example of the invention, a headset includes a detector providing an output indicating a donned or doffed condition, a memory storing a user interface control application, a user interface, a rechargeable battery, and a processor for executing the user interface control application. The user interface control application enables or disables a user interface responsive to detection of the donned or doffed condition.

In one example of the invention, a method for headset user interface management includes providing a headset user interface and detecting kinetic energy, temperature or capacitance to determine a headset characteristic. The headset characteristic is processed to determine a donned or doffed condition. The method further includes disabling or enabling the headset user interface upon determination of the donned condition or a doffed condition.

In one example of the invention, a headset includes a detector providing an output indicating a donned or doffed condition, a memory storing a user interface control application, a user interface comprising a liquid crystal display, a rechargeable battery, and a processor for executing the user interface control application. The user interface control application enables the liquid crystal display upon detection of a doffed condition and disables the liquid crystal display upon detection of a donned condition.

In one example of the invention, a method for conserving headset battery power includes detecting kinetic energy, temperature or capacitance to determine a headset characteristic and processing the headset characteristic to determine a donned or doffed condition. The method further includes disabling a headset liquid crystal display upon determination of a donned condition, and enabling a headset liquid crystal display upon determination of a doffed condition.

In one example of the invention, a headset includes a detector providing an output indicating a donned or doffed condition, a memory storing a user interface control application, a user interface comprising one or more user input devices, a rechargeable battery, and a processor for executing the user interface control application. The user interface control application locks one or more user input devices upon detection of a doffed condition.

In one example of the invention, a method for locking a headset user interface includes providing a headset with one or more user input devices and detecting kinetic energy, temperature or capacitance to determine a headset characteristic. The headset characteristic is processed to determine a donned or doffed condition. The method further includes locking one or more user input devices upon determination of a doffed condition.

Referring now to FIG. 1, a system 100 includes a headset 102 and a headset server 104 operably coupled together. Other elements may be between headset 102 and server 104, such as but not limited to, adaptors, access points, and/or networks. It is noted that server 104 may be used to route calls to multiple headsets, for example, at a call center.

Headset 102 may be wired or wireless. In one example, headset 102 may be wired to an adaptor which is coupled to a network, or headset 102 may be wirelessly coupled to an access point (AP) (not shown), which is operably coupled with a network. In one example, the network may be a communications network which may include a public switched telephone network (PSTN), an integrated services digital network (ISDN), a local area network (LAN), and/or a wireless local area network (WLAN), that support standards such as Ethernet, wireless fidelity (WiFi), and/or voice over internet protocol (VoIP).

In one example, an AP includes a transceiver and a processor configured to allow a wireless device (e.g., a headset) access to a network connected to the access point (e.g., via a 10/100 Ethernet RJ-45 port). An AP may be any device that allows wireless-equipped computers and other devices to communicate with a wired network. In one example, an AP is able to support WiFi in general, and the 802.11a, 802.11b, and/or 802.11g wireless networking standards in particular. In other examples, the AP may be able to support other wireless networking standards.

Figure 2:
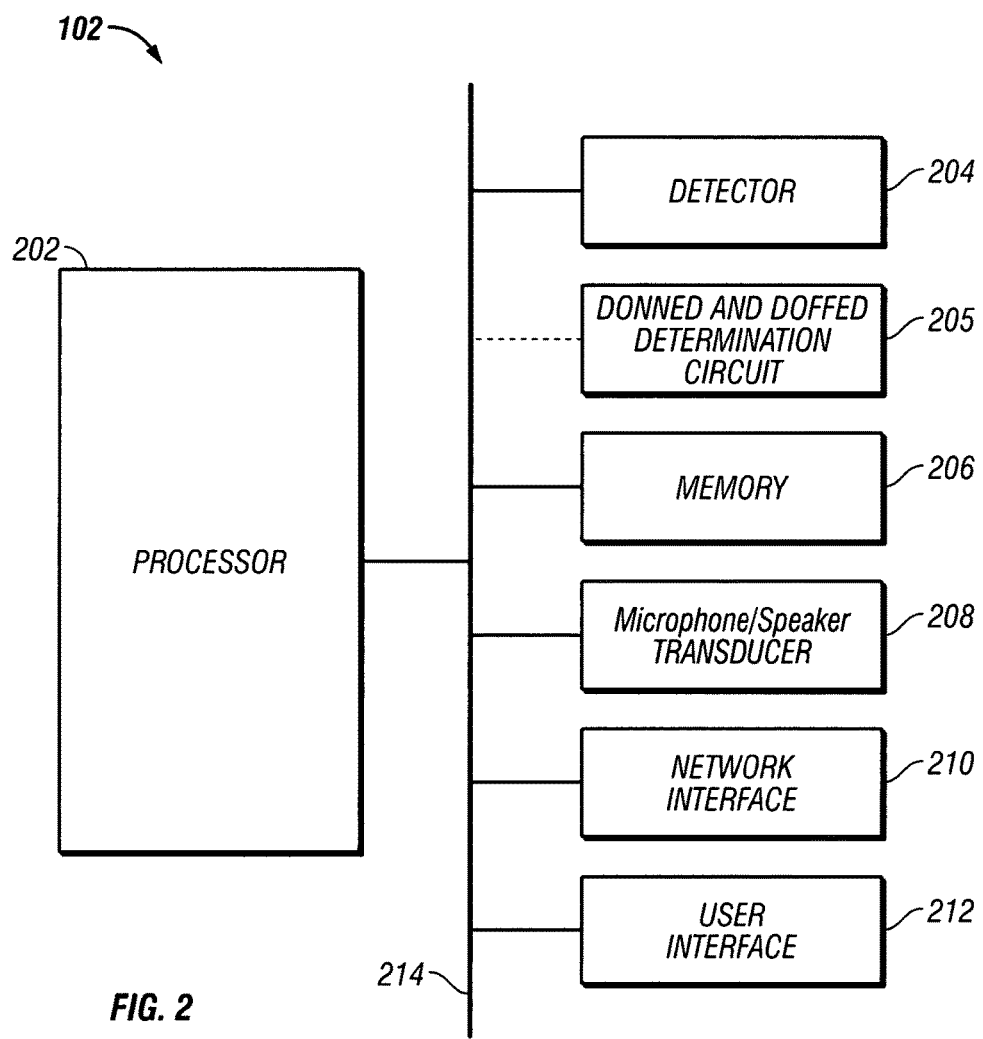
FIG. 2 shows a block diagram of a headset capable of indicating a donned or doffed state.

Referring now to FIG. 2 in conjunction with FIG. 1, a block diagram of an example of headset 102 is shown. Headset 102 includes a processor 202 operably coupled via a bus 214 to a detector 204, a donned and doffed determination circuit 205, a memory 206, a transducer 208, an optional network interface 210, and an optional user interface 212.

Processor 202 allows for processing data, in particular managing data between detector 204, determination circuit 205, and memory 206 for determining the donned or doffed state of headset 102. In one example, processor 202 may also process information about access points, service providers, and service accounts for wireless headsets. In one example, processor 202 is a high performance, highly integrated, and highly flexible system-on-chip (SOC), including signal processing functionality such as echo cancellation/reduction and gain control in another example. Processor 202 may include a variety of processors (e.g., digital signal processors), with conventional CPUs being applicable.

Detector 204 includes a motion detector and/or a non-motion detector providing output charges based upon a headset characteristic such as kinetic energy, temperature, and/or capacitance.

In the case of a motion detector, as the user wears the headset, subtle movements of the head (e.g., from standing, sitting, walking, or running) cause movements of the headset, and detector 204 transfers kinetic energy from head and body movement into an electromotive force, or an output charge. In other words, motion of the headset induces a small fluctuating current flow in a nearby electrical conductor. Current in this conductor is amplified electronically. The output charges may be provided at predetermined or varying intervals (e.g., sampling every 5 seconds) and for predetermined or varying periods (e.g., based on time or number of samples) to form an output charge pattern.

Detector 204 is operably coupled to a determination circuit 205 for determining whether a plurality of the output charges form an output charge pattern corresponding to a state selected from the group consisting of the headset being donned and doffed. In one example, determination circuit 205 compares the output charge pattern to a predetermined profile, and if the pattern is within the bounds of the predetermined profile, the headset is considered to be in a state of being donned. When there is no recognized output charge pattern for a predetermined period, then the headset may be considered to be abandoned and in a state of being doffed. In another embodiment, the output charge pattern may be recognized as a doffed output charge pattern. The output charges may be shaped using a comparator circuit which is connected to an input pin on a general purpose microcontroller. Firmware in the microcontroller may implement a filtering algorithm to discriminate between movement of a headset when doffed and the occasional movements caused by relocating a non-worn headset from one location to another. In this example, determination circuit 205 is an individual component operably coupled to other components of headset 102 via bus 214, but determination circuit 205 may be placed in various places as shown by the dashed line connection, for example being integrated with processor 202 or detector 204, stored in memory 206, or being provided from outside of headset 102, for example at server 104.

In the case of a non-motion detector, as the user wears the headset, detector 204 transfers temperature and/or capacitance readings into an electromotive force, or an output charge. Current in this conductor is amplified electronically and processed as described above with respect to motion detectors. Again, the output charges may be provided at predetermined or varying intervals and for predetermined or varying periods to form an output charge pattern.

Memory 206 may include a variety of memories, and in one example includes SDRAM, ROM, flash memory, or a combination thereof. Memory 206 may further include separate memory structures or a single integrated memory structure. In one example, memory 206 may be used to store passwords, network and telecommunications programs, and/or an operating system (OS). In one embodiment, memory 206 may store determination circuit 205, output charges and patterns thereof from detector 204, and predetermined output charge profiles for comparison to determine the donned and doffed state of a headset.

Transducer 208 may include an acoustic transducer, such as a microphone, a speaker, or a combination thereof, for transmission of sound (such as from the user's mouth or to the user's ear based upon signals from an audio source). Transducer 208 may also include a plurality of separate transducers for performing different functions. The transducer can be any type of electromagnetic, piezoelectric, or electrostatic type of driving element, or a combination thereof, or another form of driving element, for generating sound waves from the output face of the transducer. In one embodiment, the transducer may receive signals through wireless communication channels, such as by Bluetooth™ protocols and hardware, in one example.

Network interface 210 allows for communication with APs, and in one example includes a transceiver for communicating with a wireless local area network (LAN) radio transceiver (e.g., wireless fidelity (WiFi), Bluetooth, ultra wideband (UWB) radio, etc.) for access to a network (e.g., a wireless LAN or the Internet), or an adaptor for providing wired communications to a network. In one example, network interface 210 is adapted to derive a network address for the headset using the headset's electronic serial number, which is used to identify the headset on the network. In one embodiment, the electronic serial number may be the headset's Media Access Control (MAC) address; however, the electronic serial number may be any number that is mappable to a network address. Network interface 210 is adapted to communicate over the network using the network address that it derives for the headset. In one embodiment, network interface 210 is able to transmit and receive digital and/or analog signals, and in one example communicates over the network using IP, wherein the network interface uses the headset's MAC address or another globally unique address as its IP address. In particular, network interface 210 may be operably coupled to a network via the IEEE 802.11 protocol. However, the network interface 210 may communicate using any of various protocols known in the art for wireless or wired connectivity.

An example of an applicable network interface and the Internet protocol layers (and other protocols) of interest are described in pending U.S. patent application Ser. No. 10/091,905 filed Mar. 4, 2002, the full disclosure of which is hereby incorporated by reference for all purposes.

User interface 212 allows for manual communication between the headset user and the headset, and in one example includes an audio and/or visual interface such that a prompt may be provided to the user's ear and/or an LED may be lit.

Referring now to FIGS. 3 through 13, different embodiments of detector 204 are described. FIGS. 3 through 6 illustrate examples of motion detectors, and FIGS. 7 through 13 illustrate examples of non-motion.

Figure 3A:
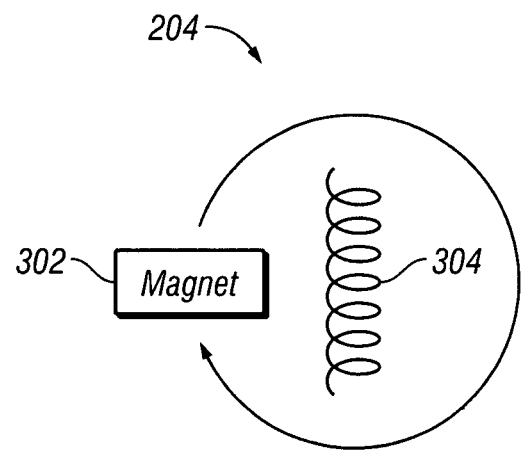
Figure 3B:
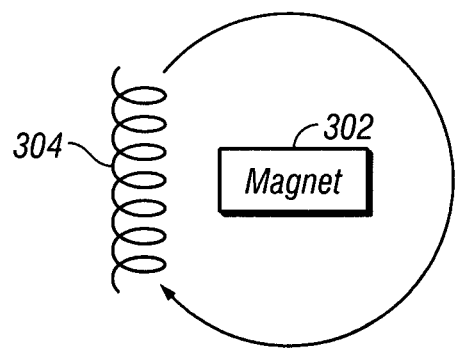

FIGS. 3A and 3B illustrate a magnet 302 and a conductor 304, such as a coil, that move relative to one another such that an output charge is generated in accordance with an embodiment. FIG. 3A illustrates a movable magnet 302 that moves relative to a fixed conductor 304, and FIG. 3B illustrates a movable conductor 304 that moves relative to a fixed magnet 302. The movable component may be hinged, suspended mechanically, or otherwise movably coupled so that gravity or inertia drives slight movement with respect to the headset whenever the headset wearer moves his head or body. In one example, the fixed magnet may be the same magnet used in a moving-coil transducer contained in the headset. The induced current in the conductive element is amplified, sent to a donned and doffed determination circuit (for example a part of a printed circuit board assembly), and processed as described above to determine a state of the headset.

Figure 3C:
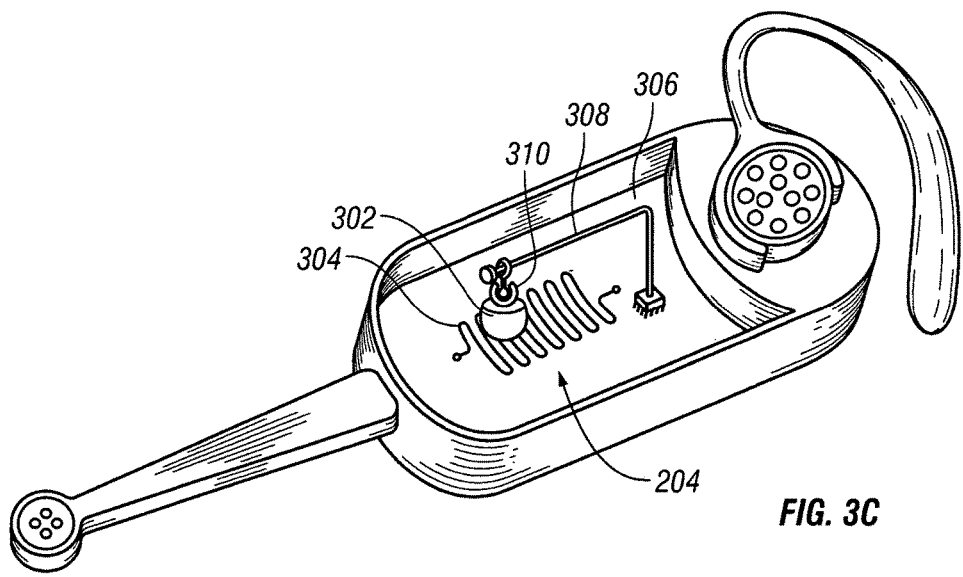
Figure 3D:
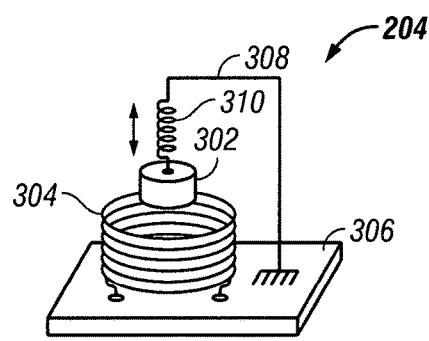
Figure 3E:
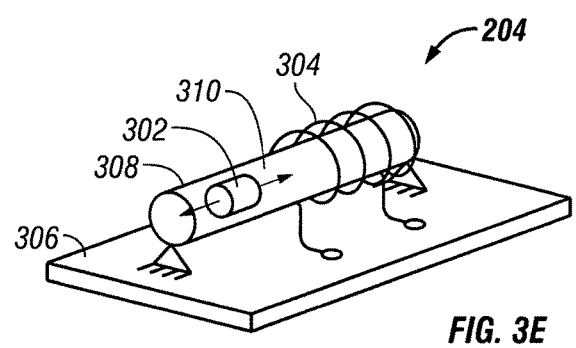

FIGS. 3C through 3E illustrate in more detail embodiments of magnet 302 movable with respect to a fixed conductor 304. FIGS. 3C, 3D, and 3E show a movable magnet 302 and a fixed conductor 304, which is operably coupled to a printed circuit board assembly (PCBA) 306.

In FIGS. 3C and 3D, magnet 302 is movably coupled to magnet support 308 via a joint 310, which allows magnet 302 to move in various directions relative to conductor 304. In FIG. 3C, joint 310 may include a ball-and-socket type joint slidably coupled along support 308 allowing magnet 302 to move over trace conductor 304. In FIG. 3D, joint 310 may include a spring that allows magnet 302 to move along an interior of coil conductor 304. In FIG. 3E, magnet 302 is movable within support 308, which is filled with a fluid 310, in one example a ferrofluid, allowing magnet 302 to move along an interior of coil conductor 304 that surrounds at least a portion of support 308.

Figure 3F:
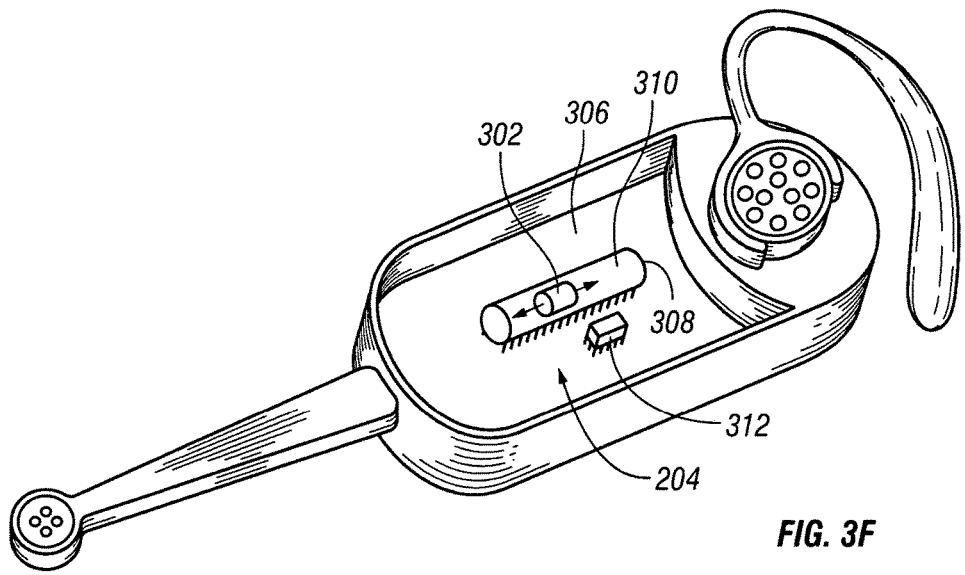

FIG. 3F shows a similar detector as in FIG. 3E, including magnet 302, PCBA 306, support 308, and fluid 310, but instead of conductor 304, a sensor 312 is positioned proximate to support 308 for sensing movement of magnet 302 (e.g., sensing if the magnet passes the sensor). In one example, with no intent to limit the invention thereby, sensor 312 may include a Hall effect sensor, a reed switch, and/or an optical switch.

Figure 4A:
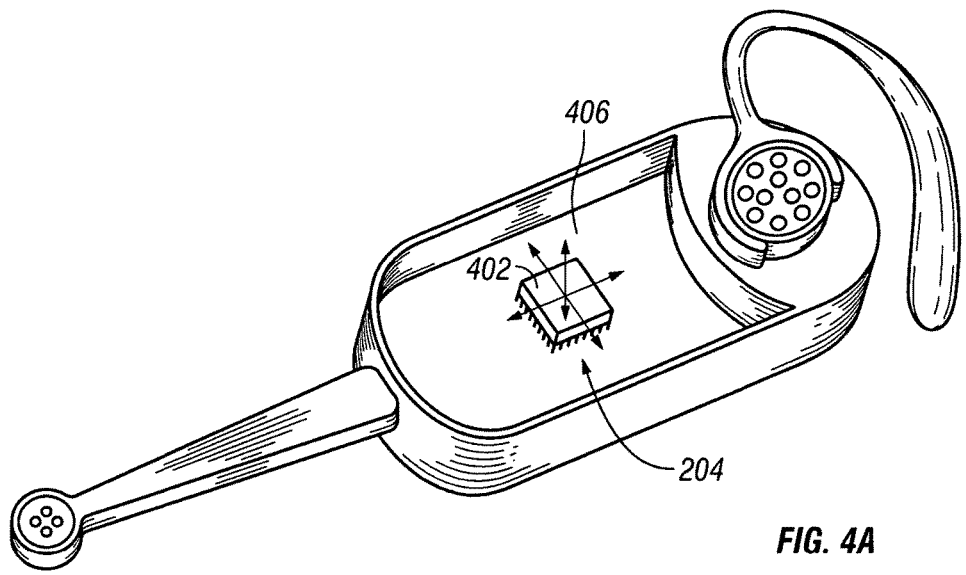

FIG. 4A illustrates an acceleration sensor 402 operably coupled to a PCBA 406 in accordance with an embodiment. In one example, acceleration sensor 402 includes a mass affixed to a piezoelectric crystal. The mass is coupled to a supporting base through the piezoelectric crystal. When the sensor is subjected to kinetic activity, the sensor experiences force due to the acceleration of the mass, thereby exerting a force on the crystal. This force results in an output charge of the crystal that is directly proportional to the input acceleration. The variations in force against the crystal resulting from the movements of the headset result in various output charge. The output charge is amplified, sent to a donned and doffed determination circuit, and processed as described above to determine a state of the headset.

Examples of applicable micro-electronic mechanical acceleration sensors, such as piezoelectric accelerometers, are dual and tri-axis accelerometers model series KXM and KXP, available from Kionix, Inc. of Ithaca, N.Y. Various piezoelectric crystal materials may be used for the accelerometer construction, such as ceramic lead metaniobate, lead zirconate, lead titanate, and natural quartz crystal. Various mechanical configurations of the masses and crystals may also be used, including but not limited to isolated compression, shear, and ring shear, to name a few.

In another embodiment, acceleration sensor 402 may include strain gauges in one or more axes of the headset, as illustrated in FIGS. 4B, 4B1, and 4B2. In one example, detector 204 includes a mass 420 coupled to an end of a flexible membrane 424 and thin electrical traces 422 (strain gauge element) on flexible membrane 424 and operably coupled to PCBA 406. FIGS. 4B1 and 4B2 illustrate membrane 424 flexing along opposite directions, respectively, as illustrated by the arrows. The flexing of membrane 424 effectively lengthens and thins (flexes, compresses; and/or elongates) the traces 422, increasing the resistance through the trace pattern. Kinetic energy from movement of the headset causes variations in the resistance of the trace pattern, thereby allowing for determination of a donned or doffed state of the headset.

FIGS. 5A and 5B illustrate a detector 204 including a movable conductor 502 and a capsule 508 having electrical contacts 504 in accordance with an embodiment. FIG. 5A illustrates conductor 504 that is loosely contained within capsule 508, and FIG. 5B illustrates conductor 502 that is suspended within capsule 508. Conductor 502 is made of electrically conductive material and movable such that gravity and/or inertia causes conductor 502 to move with respect to the headset whenever the headset wearer moves the headset. Electrical contacts 504 are positioned within capsule 508 such that contact with movable conductor 502 causes an electric current or output charge to be produced, which is amplified, sent to a donned and doffed determination circuit, and processed as described above to determine a state of the headset.

In FIG. 5A, conductor 502 closes a circuit by bridging a gap between electrical contacts 504, allowing an electric current to flow intermittently. In FIG. 5B, conductor 502 is suspended from a pivot point inside the headset so that headset movement causes the conductor to move and touch contact points that surround the conductor, effectively closing and opening a circuit to thereby allow electric current to flow intermittently.

In another example, the electrical contacts may be configured in groups of two or more sets so that the motion of the weight in differing directions may be registered, thereby providing more data for determining the headset state. For example, a movable conductive mass is loosely contained in a housing that includes many contacts, such that movement of the mass opens and closes circuits as the mass makes and breaks contact with the housing contacts. The sensitivity of this detector can be tuned to detect the axis or direction of the movement, where alternate contacts are connected to different points on the circuit. Accordingly, this configuration can be arranged to determine when the user of the headset is shaking his or her head from side-to-side or nodding up and down, differentiating between the two motions by monitoring which circuit(s) are opening and closing, thereby allowing the user to input information into the headset, such as when responding to a call-answer prompt with a nod "yes" or shake of the head "no".

FIGS. 5C, 5C1, 5C2, and 5C3 illustrate in greater detail an embodiment of a detector 204 including a movable conductor 502 and a fixed capsule 508 having electrical contacts 504 operably coupled to a PCBA 506. Conductor 502 is freely movable within spherical capsule 508 (as shown by arrows in FIG. 5C1), and creates or closes different circuits 512 as conductor 502 makes contact with electrical contacts 504 (as shown by FIGS. 5C2 and 5C3).

FIGS. 6A and 6B illustrate a detector 204 including a light source 602, a photosensor 606, and a movable reflective surface 604, 608 therebetween in accordance with an embodiment. FIG. 6A illustrates surface 604 that may be suspended, pinned, or loosely trapped, such that surface 604 at a rest state allows photosensor 606 to receive light from light source 602. Movement of the headset causes surface 604 to move such that photosensor 606 detects a change in the amount of light received and induces fluctuating current flow in a nearby electrical conductor. Alternatively, in FIG. 6B, surface 608 may be suspended, pinned, or loosely trapped, such that surface 608 at a rest state impedes light from reaching photosensor 606. Movement of the headset causes surface 608 to move such that photosensor 608 detects a change in the amount of light received and induces fluctuating current flow in a nearby electrical conductor. The current flow or output charge produced is amplified, sent to a donned and doffed determination circuit, and processed as described above to determine a state of the headset. In yet another example, surface 604, 608 could include a hole through which light from light source 602 travels, thereby providing changed amount of light received by photosensor 606 as the surface 604, 608 moves as the headset is moved.

As noted above, detector 204 may include a non-motion detector that provides output charges based upon a headset characteristic such as temperature and/or capacitance. When a headset is properly worn, several surfaces of the headset touch or are in operable contact with the user. These touch/contact points can be monitored and used to determine the donned or doffed state of the headset.

FIG. 7 illustrates an infra-red (IR) detector 702 that is sensitive to the temperature of a human body. Humans having a skin temperature of about 93 degrees Fahrenheit, radiate infra-red energy with a wavelength between about 9 and 10 micrometers. Therefore, the IR detector may be configured to be sensitive in the range of 8 to 12 micrometers, and may be positioned to aim at a point where the headset is intended to contact a user's skin, such as the user's skin or hair. When the headset user dons the headset, the IR detector 702 detects radiation in the wavelengths between 9 and 10 micrometers and provides an electrical signal or output charge that is amplified, sent to a donned and doffed determination circuit, and processed as described above to determine a state of the headset.

FIGS. 8A and 8B illustrate a pyroelectric sensor 802 that is positioned in close proximity to a point where the headset is intended to contact a user's skin. The sensor detects a user is present by determining a skin temperature near 93 degrees Fahrenheit and then providing an electrical signal or output charge that is amplified, sent to a donned and doffed determination circuit, and processed as described above to determine a state of the headset. As shown in FIG. 8B, two pyroelectric sensors 802a and 802b may be used, with one sensor positioned close to a contact point and the other positioned in a location away from a contact point. Differences (a delta) between the readings of the two sensors can be used to determine a donned or doffed state of the headset, for example if the delta of the two temperature readings is at or above a predetermined level.

FIG. 9 illustrates an electronic circuit 902 sensitive to capacitance positioned in close proximity to a point where the headset is intended to contact a user's skin. The circuit detects an increase in capacitance when the headset is worn and provides an output charge that is amplified, sent to a donned and doffed determination circuit, and processed as described above to determine a state of the headset.

Figure 10:
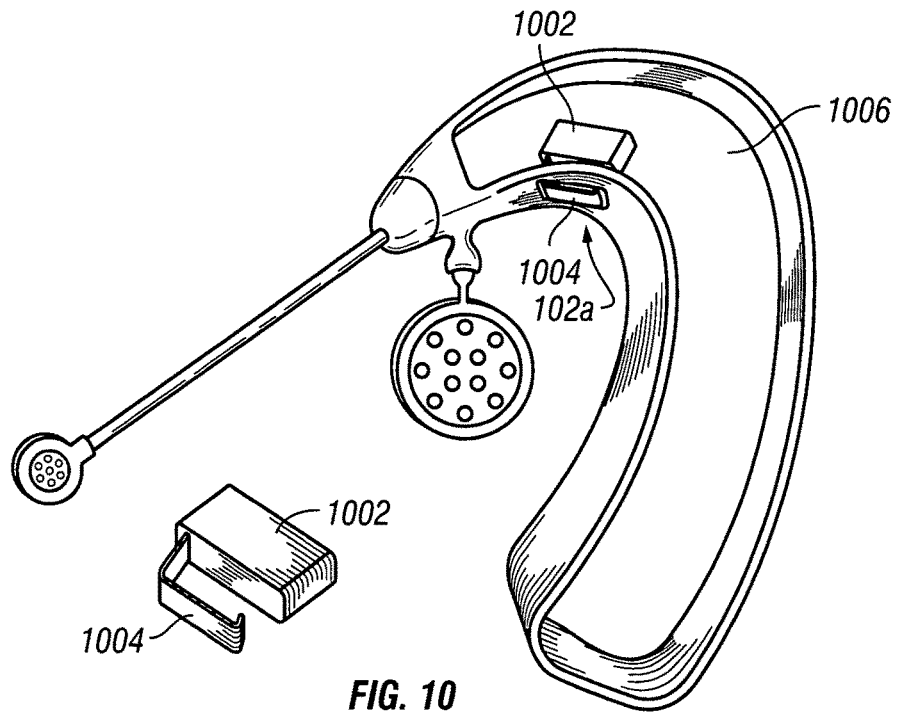

Other detectors that may be used at a touch point include micro-switches, as shown in FIG. 10. A micro-switch 1002 can be housed and operably coupled to a PCBA 1006 within the headset device such that an actuator 1004 of the switch is positioned at a touch point 102a of the headset, thereby being depressed when the headset is worn. A determination circuit in PCBA 1006 can monitor the state of the switch, thereby determining the state of the headset.

Figure 11:
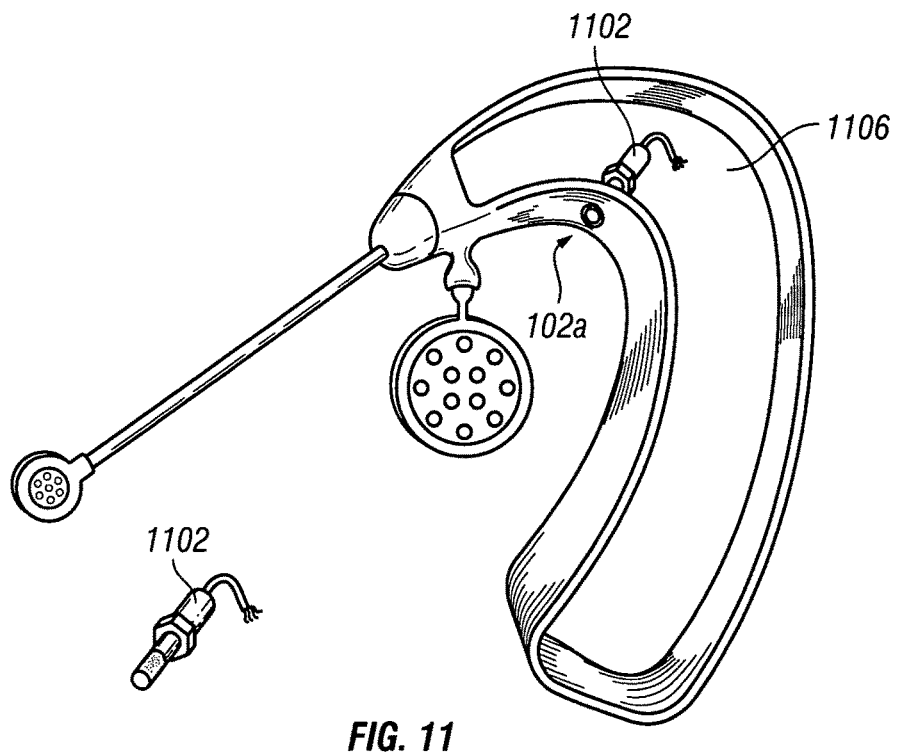

Another detector that may be used includes an inductive proximity sensor 1102, as shown in FIG. 11. A proximity switch 1102 can be housed and operably coupled to a PCBA 1106 within the headset device such that the switch 1102 is positioned at a touch point 102a of the headset, thereby being triggered or activated when the headset is worn. This use of a proximity switch does not require force from the user's skin, but proximity to the user (without consistent force) such that a change in magnetic field is detected is sufficient to trigger the sensor. A determination circuit in PCBA 1106 can monitor the state of the switch, discriminating between a donned or doffed state of the headset.

Figure 12:
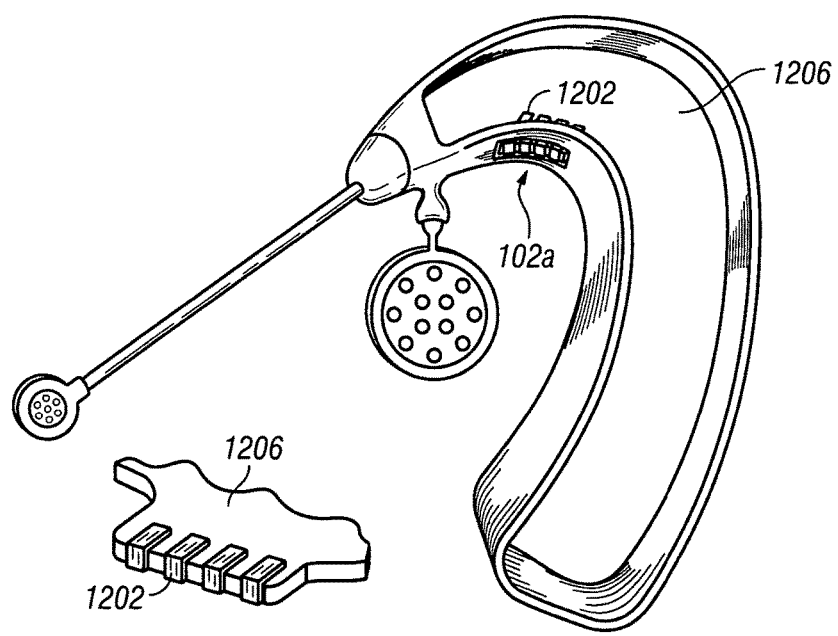

Yet another detector that may be used includes a skin resistivity sensor 1202, as shown in FIG. 12. Conductive materials 1202 can be used at two or more touch points 102a on the headset, and a circuit in PCBA 1206 can monitor the resistance between these conductive materials, thereby detecting a resistance that is consistent with a predetermined range, thus discriminating between a donned and a doffed state of the headset. That is, when the two or more contact points are in contact with the user's skin, the resistance reading between these contact points will be different from when the headset is not worn, for example the resistance being reduced when the headset is worn due to the skin adding conductance.

Figure 13:
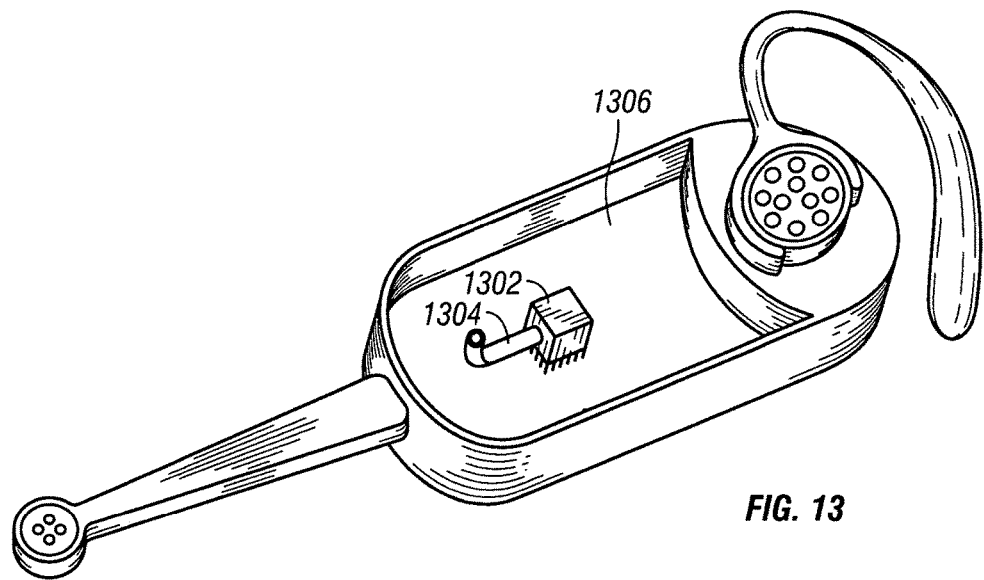

Referring now to FIG. 13, another detector that may be utilized includes a carbon dioxide ($CO_2$) sensor 1302 operably coupled to a PCBA 1306 and a channel 1304 in accordance with an embodiment. Sensor 1302 is able to detect an increase of $CO_2$, thereby inferring a donned state of a headset. In one embodiment, sensor 1302 is able to subtract background $CO_2$ levels to more accurately discriminate between donned and doffed states, and in another embodiment, sensor 1302 and a determination circuit are able to detect patterns of $CO_2$ levels correlating to human breathing patterns.

It is noted that a variety of detectors that provide an output charge pattern corresponding to a donned or doffed state of a headset are within the scope of the present invention.

In critical applications, two or more of the embodiments described above may be used in one headset in order to determine a donned or doffed headset state with greater accuracy and reliability. For example, in one case with one motion detector and one non-motion detector being used, a headset state can be indicated when both detectors indicate the same state.

Figure 14:
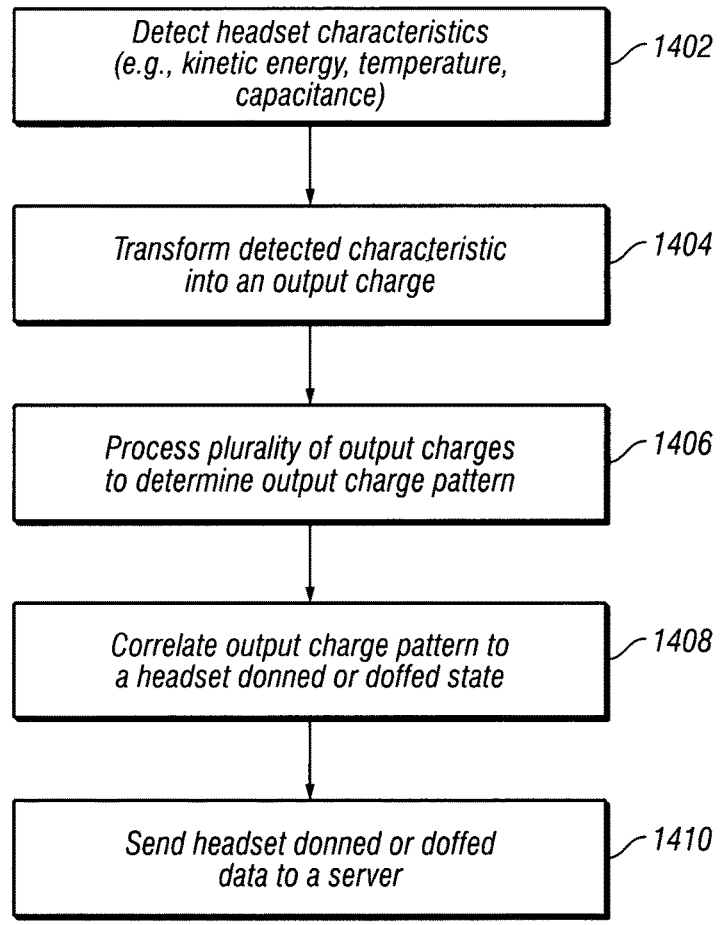
FIG. 14 is a flowchart showing a method of determining a donned or doffed state of a headset.

Referring now to FIG. 14 in conjunction with FIGS. 1 and 2, a flowchart of a method for determining the donned or doffed state of a headset is illustrated in accordance with an embodiment. At step 1402, a headset characteristic, such as kinetic energy, temperature, and/or capacitance, is detected by a detector 204. At step 1404, the detector provides an output charge corresponding to a detected characteristic. The output charge is amplified and transferred to determination circuit 205. At step 1406, a plurality of output charges are processed by determination circuit 205 to determine an output charge pattern. At step 1408, determination circuit 205 correlates the output charge pattern to a donned or doffed state of a headset, in one example comparing the output charge pattern to predetermined output charge profiles that reflect a donned or doffed state of a headset. The predetermined output charge profiles may be in look-up tables or a database and may include a variety of parameters, such as for particular headsets and detectors being used. At step 1410, the headset state may be sent to server 104 for routing of calls or messages, or for notifying a system regarding volume control for hearing impaired use.

Further discussion regarding the use of sensors or detectors to detect a donned or doffed state can be found in the commonly assigned U.S. Pat. No. 8,335,312 entitled "Donned and Doffed Headset State Detection" which was filed on Oct. 2, 2006, and which is hereby incorporated into this disclosure by reference.

Figure 15:
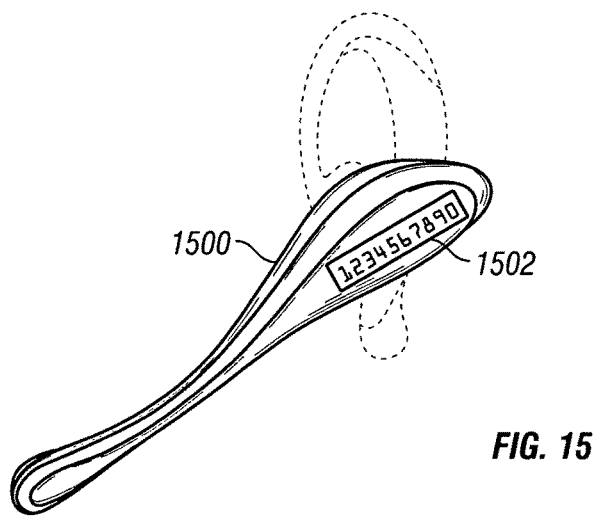
FIG. 15 illustrates a headset having an LCD, the headset capable of indicating a donned or doffed state and responsively controlling the LCD based on the donned or doffed state.

FIG. 15 illustrates a headset having an LCD, the headset capable of indicating a donned or doffed state and responsively controlling the LCD based on the donned or doffed state. Headset 1500 includes a LCD 1502 on the exterior of the headset on which various data is displayed.

Figure 16:
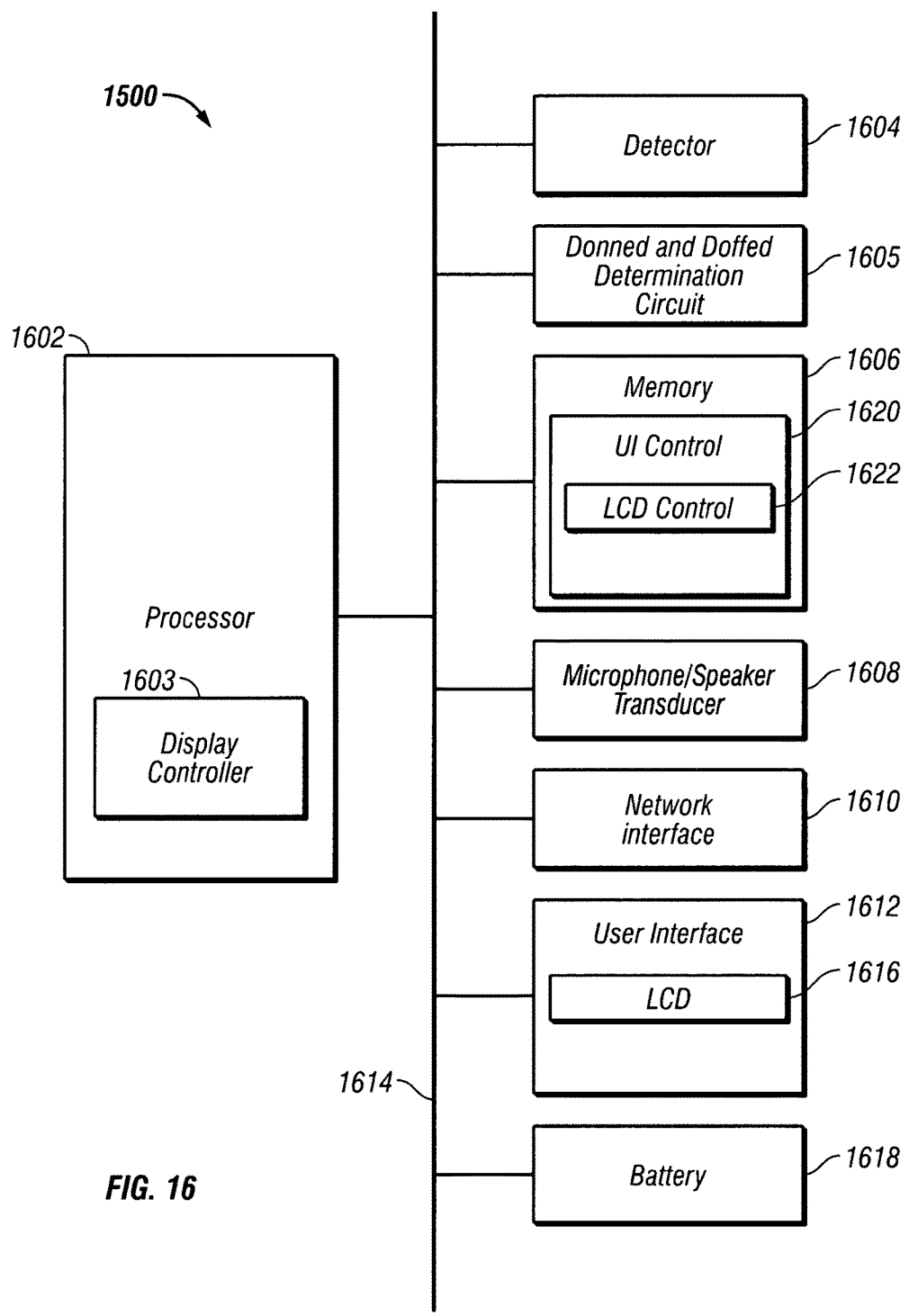
FIG. 16 illustrates a simplified block diagram of the components of the headset shown in FIG. 15.

FIG. 16 illustrates a simplified block diagram of the components of the headset shown in FIG. 15. The headset 1500 includes a processor 1602 operably coupled via a bus 1614 to a detector 1604, a donned and doffed determination circuit 1605, a memory 1606, a transducer 1608, an optional network interface 1610, and a user interface 1612. User interface 1612 includes an LCD 1616 for displaying alphanumeric data. Processor 1602 includes a display controller 1603 for operating LCD 1616. User interface 1612 also allows for manual communication between the headset user and the headset, and in one example includes a variety of input buttons or keys. Such input buttons may include for example on/off buttons or arrow keys. Such input buttons may control, for example, volume, on/off, mute, or menu selection and control access to personal information residing on the headset, such as contacts, passwords, medical information.

Memory 1606 includes a user interface control application 1620, including LCD control 1622. Memory 1606 may include a variety of memories, and in one example includes SDRAM, ROM, flash memory, or a combination thereof. Memory 1606 may further include separate memory structures or a single integrated memory structure. In one example, memory 1606 may be used to store passwords, network and telecommunications programs, and/or an operating system (OS). In one embodiment, memory 1606 may store determination circuit 1605, output charges and patterns thereof from detector 1604, and predetermined output charge profiles for comparison to determine the donned and doffed state of a headset.

Processor 1602, using executable code and applications stored in memory or read into random access memory, performs the necessary functions associated with headset operation described herein. The processor 1602 controls the liquid crystal display 1616 via a liquid crystal display driver to display information according to an instruction input in a font of an appropriate size. Processor 1602 allows for processing data, in particular managing data between detector 1604, determination circuit 1605, and memory 1606 for determining the donned or doffed state of headset 1500, and determining whether the state of the headset has switched from being doffed to donned. Processor 1602 further controls the operating state of LCD 1616 using LCD control 1622. LCD control 1622 may be implemented as either firmware or software. In one example, processor 1602 is a high performance, highly integrated, and highly flexible system-on-chip (SOC), including signal processing functionality such as echo cancellation/reduction and gain control in another example. Processor 1602 may include a variety of processors (e.g., digital signal processors), with conventional CPUs being applicable.

The structure and operation of detector 1604 and donned and doffed determination circuit 1605 are as described herein above in reference to FIG. 2. For example, detector 1604 may be a motion detector. The motion detector may take a variety of forms such as, for example, a magnet and a coil moving relative to one another, or an acceleration sensor having a mass affixed to a piezoelectric crystal. The motion detector may also be a light source, a photosensor, and a movable surface therebetween. In further examples, the detector may include one or more of the following: an infra-red detector, a pyroelectric sensor, a capacitance circuit, a micro-switch, an inductive proximity switch, a skin resistance sensor, or at least two pyroelectric sensors for determining a difference in temperature readings from the two pyroelectric sensors.

In one example the headset continuously monitors donned and doffed status of the headset. Upon detection that the headset is in a donned status, operation of LCD 1616 is turned off. Upon detection that the headset is in a doffed status, operation of LCD 1616 is turned on. The structure and operation of transducer 1608 and network interface 1610 in one example are substantially similar to that described herein above in reference to FIG. 2.

Figure 17:
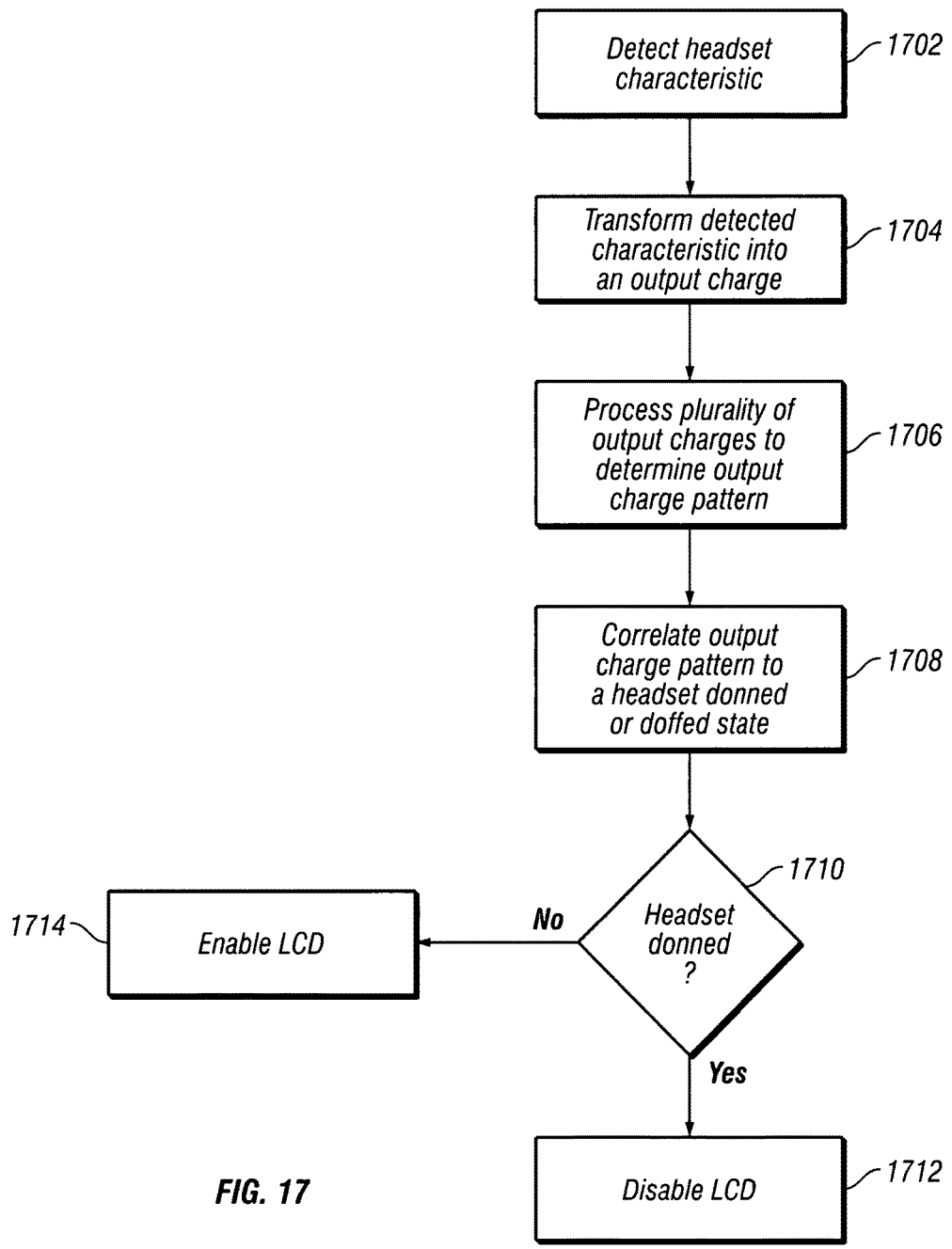
FIG. 17 is a flowchart illustrating an exemplary process by which the headset in FIG. 16 operates to control the headset LCD.

FIG. 17 is a flowchart illustrating an exemplary process by which the system in FIG. 16 operates to control the headset LCD. At block 1702, a headset characteristic, such as kinetic energy, temperature, and/or capacitance, is detected by a detector 1604. At block 1704, the detector provides an output charge corresponding to a detected characteristic. The output charge is amplified and transferred to determination circuit 205. At block 1706, a plurality of output charges are processed by determination circuit 1605 to determine an output charge pattern. At block 1708, determination circuit 1605 correlates the output charge pattern to a donned or doffed state of a headset, in one example comparing the output charge pattern to predetermined output charge profiles that reflect a donned or doffed state of a headset. The predetermined output charge profiles may be in look-up tables or a database and may include a variety of parameters, such as for particular headsets and detectors being used. In one example, at decision block 1710, the headset controller determines whether the headset is in a donned state. If no at decision block 1710, then operation of the LCD is enabled at block 1714. If yes at decision block 1710, then at block 1712 the operation of the LCD is disabled. For example, the LCD is powered off. In this manner, headset power is conserved by eliminating operation of the LCD when it will not be viewed.

Figure 18:
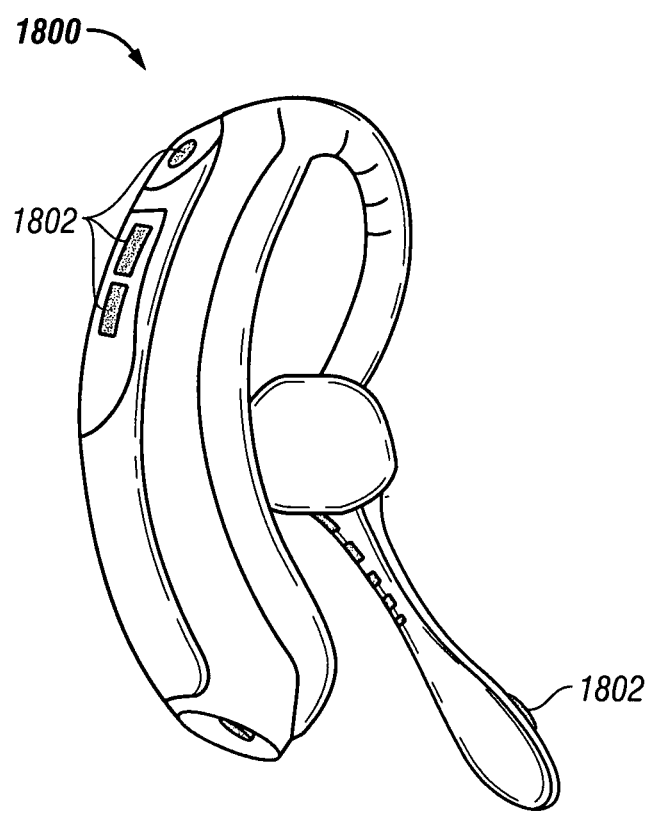
FIG. 18 illustrates a headset having a plurality of user input devices, the headset capable of indicating a donned or doffed state and responsively controlling the user input devices based on the donned or doffed state.

FIG. 18 illustrates a headset 1800 having user interface inputs 1802, the headset capable of indicating a donned or doffed state and responsively controlling the user interface inputs 1802 to enter either a locked state, partially locked state, or an active state based on the donned or doffed state. User interface inputs 1802 may include, for example, keys, buttons, or a touchpad to control functions such as power, volume, mute, and select buttons. Headset 1800 prevents accidental operation of the headset resulting from unintended touching or depression of user interface inputs 1802, such as when headset 1800 is placed in a bag or pocket. In one example, only certain user interface inputs 1802 are locked while others remain active.

Headset 1800 may include an optional user interface output such as an LCD on the exterior of the headset on which various data is displayed, which operates as described above in reference to FIGS. 15-17. However, headset 1800 need not have the LCD. Where headset 1800 includes a donned or doffed controlled LCD, only a subset of user interface inputs 1802 are locked while others remain active, such as those associated with the LCD. In a further example, the function of a particular user interface input key or button varies based upon whether the headset is donned or doffed.

Figure 19:
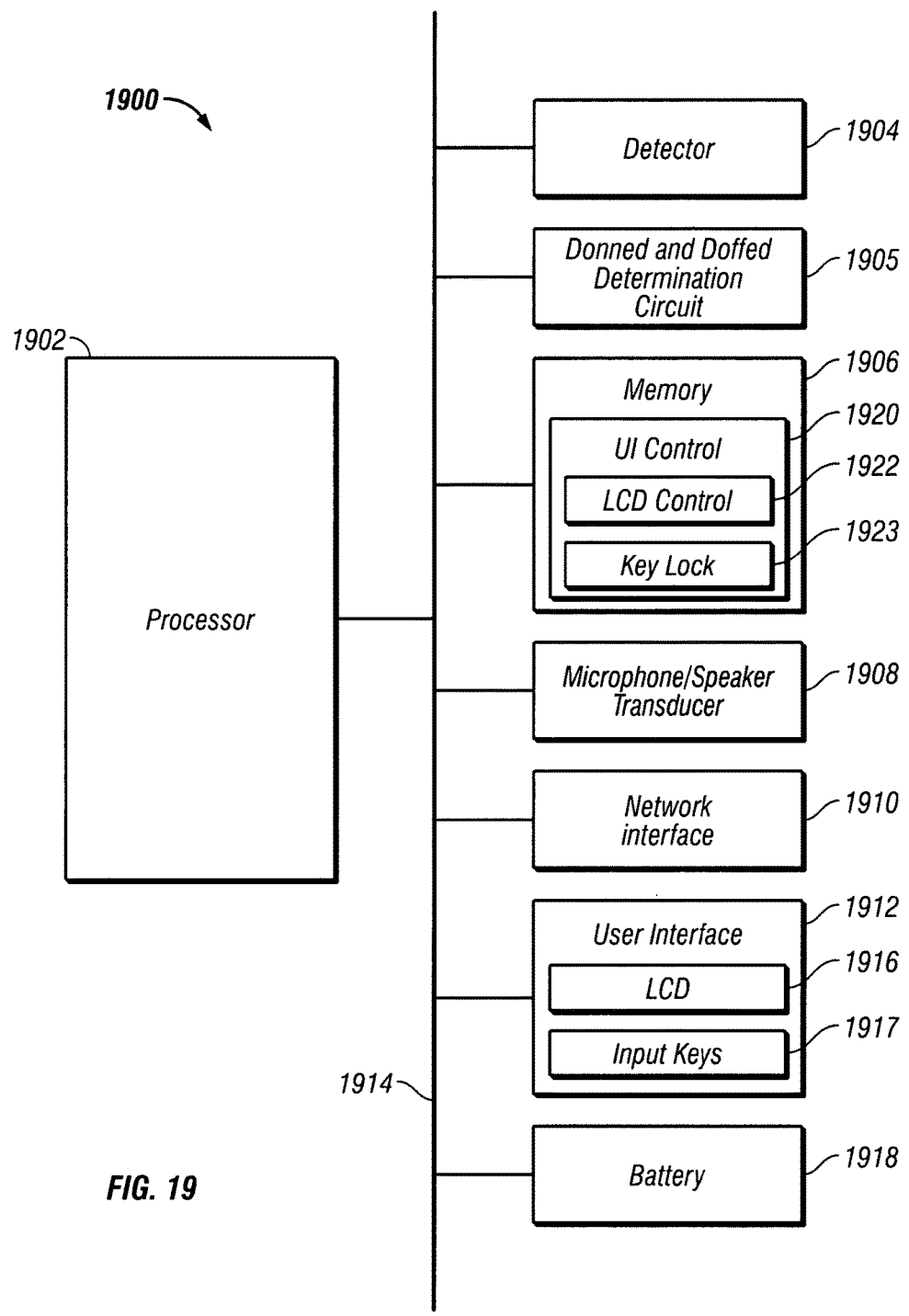
FIG. 19 illustrates a simplified block diagram of the components of the headset shown in FIG. 18.

FIG. 19 illustrates a simplified block diagram of the components of the headset shown in FIG. 18. In this example, headset 1800 includes an optional LCD. The headset 1800 includes a processor 1902 operably coupled via a bus 1914 to a detector 1904, a donned and doffed determination circuit 1905, a memory 1906, a transducer 1908, an optional network interface 1910, and a user interface 1912. User interface 1912 includes an LCD 1916 and associated LCD controller for displaying alphanumeric data. User interface 1912 also allows for manual communication between the headset user and the headset, and in one example includes a variety of buttons or user input keys 1917.

Memory 1906 includes a user interface control application 1920, including LCD control 1922 and key lock 1923. Memory 1906 may include a variety of memories, and in one example includes SDRAM, ROM, flash memory, or a combination thereof. Memory 1906 may further include separate memory structures or a single integrated memory structure. In one example, memory 1906 may be used to store passwords, network and telecommunications programs, and/or an operating system (OS). In one embodiment, memory 1906 may store determination circuit 1905, output charges and patterns thereof from detector 1904, and predetermined output charge profiles for comparison to determine the donned and doffed state of a headset.

Processor 1902, using executable code and applications stored in memory or read into random access memory, performs the necessary functions associated with headset operation described herein. The processor 1902 controls the liquid crystal display 1916 via a liquid crystal display driver to display information according to an instruction input in a font of an appropriate size. Processor 1902 allows for processing data, in particular managing data between detector 1904, determination circuit 1905, and memory 1906 for determining the donned or doffed state of headset 1800, and determining whether the state of the headset has switched from being doffed to donned. Processor 1902 further controls the operating state of user interface input keys 1917, i.e. whether they are in a locked state or whether they are operational to receive and process user actions. The key lock 1923 may be implemented as either firmware or software residing in memory 1906. In one example, processor 1902 is a high performance, highly integrated, and highly flexible system-on-chip (SOC), including signal processing functionality such as echo cancellation/reduction and gain control in another example. Processor 1902 may include a variety of processors (e.g., digital signal processors), with conventional CPUs being applicable.

The structure and operation of detector 1904 and donned and doffed determination circuit 1905 are as described herein above in reference to FIG. 2. For example, detector 1904 may be a motion detector. The motion detector may take a variety of forms such as, for example, a magnet and a coil moving relative to one another, or an acceleration sensor having a mass affixed to a piezoelectric crystal. The motion detector may also be a light source, a photosensor, and a movable surface therebetween. In further examples, the detector may include one or more of the following: an infra-red detector, a pyroelectric sensor, a capacitance circuit, a micro-switch, an inductive proximity switch, a skin resistance sensor, or at least two pyroelectric sensors for determining a difference in temperature readings from the two pyroelectric sensors.

In one example the headset continuously monitors donned and doffed status of the headset. Upon detection that the headset is in a doffed status, one or more of the user input keys 1917 are placed in a locked state to avoid inadvertent actions. For example, one or more of the user input keys corresponding to initiation of calls, redial, call answer, call reject, stereo play, and volume control may be locked. In one example, the call answer user input key is not locked when the headset is in a doffed status in order to allow the headset user to easily answer an incoming call. When a user input key is placed in a locked state, the input function is not carried about by the processor. For example, the processor may ignore any commands received from the user input key while in a locked state. In a further example, power to the user input key circuitry is disabled. When the key lock is enabled, headset display LCD 1916 under control of the processor 1902 may show a "Key Lock" or similar message.

Upon detection that the headset is in a donned status, operation of user input keys 1917 is activated. The key lock may also be removed or initiated manually, with key lock 1923 providing for a mechanism by which the user may unlock or the headset by depressing a pre-defined sequence of keys. User interface output devices may also be placed in a locked or unlocked state responsive to the donned or doffed status.

Figure 20:
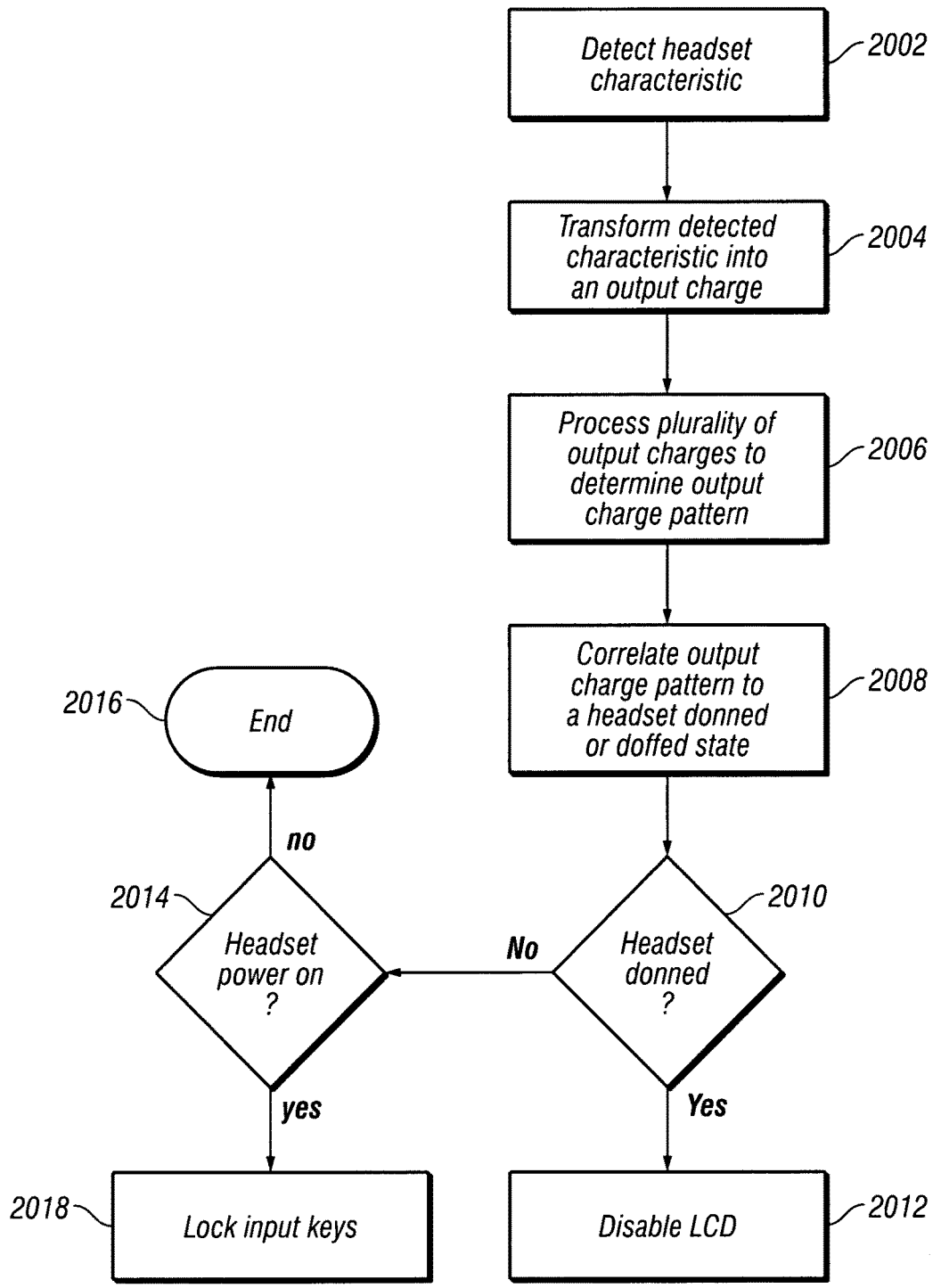
FIG. 20 is a flowchart illustrating an exemplary process by which the headset in FIG. 18 operates to lock the headset user input devices.

FIG. 20 is a flowchart illustrating an exemplary process by which the system in FIG. 19 operates to control the user interface 1912. At block 2002, a headset characteristic, such as kinetic energy, temperature, and/or capacitance, is detected by a detector 1904. At block 2004, the detector provides an output charge corresponding to a detected characteristic. The output charge is amplified and transferred to determination circuit 205. At block 2006, a plurality of output charges are processed by determination circuit 1905 to determine an output charge pattern. At block 2008, determination circuit 1905 correlates the output charge pattern to a donned or doffed state of a headset, in one example comparing the output charge pattern to predetermined output charge profiles that reflect a donned or doffed state of a headset. The predetermined output charge profiles may be in look-up tables or a database and may include a variety of parameters, such as for particular headsets and detectors being used. In one example, at decision block 2010, the headset controller determines whether the headset is in a donned state. If no at decision block 2010, then at decision block 2014 it is determined if the headset power is on. If yes at decision block 2014, then at block 2018 one or more inputs of the headset user interface are locked. For example, a "lock enable" flag may be set in the memory of the processor for one or more user input buttons. If the lock enable flag is set, the processor will suspend the normal operation associated with the locked input key. In this manner, inadvertent operation of the headset while being carried or stowed is eliminated. If no at decision block 2014, the process ends. If yes at decision block 2010, the operation of the LCD is disabled at block 2012.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the methods and systems described herein may be applied to other body worn devices in addition to headsets. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A headset comprising:
   a detector providing an output indicating a donned or doffed condition;
   a memory storing a user interface control application;
   a user interface comprising a display;
   a rechargeable battery; and
   a processor for executing the user interface control application, wherein the user interface control application enables the display upon detection of a doffed condition and disables the display upon detection of a donned condition.

2. The headset of claim 1, wherein the detector comprises a motion detector.

3. The headset of claim 2, wherein the motion detector includes a magnet and a coil moving relative to one another.

4. The headset of claim 2, wherein the motion detector includes an acceleration sensor having a mass affixed to a piezoelectric crystal.

5. The headset of claim 2, wherein the motion detector includes a light source, a photosensor, and a movable surface therebetween.

6. The headset of claim 1, wherein the detector comprises one selected from the group consisting of an infra-red detector, a pyroelectric sensor, a capacitance circuit, a micro-switch, an inductive proximity switch, a skin resistance sensor, and at least two pyroelectric sensors for determining a difference in temperature readings from the two pyroelectric sensors.

7. A headset comprising:
   a detector means for providing an output indicating a donned or doffed condition;
   a memory means;
   a battery powered display means for displaying information;
   a display control means for enabling or disabling the battery powered display means responsive to the output indicating the donned or doffed condition; and
   a processing means for controlling headset operations.

8. The headset of claim 7, wherein the detector means comprises a motion detecting means for detecting headset movement.

9. A method for locking a headset user interface comprising:
   providing a headset with one or more user input devices;
   detecting a headset characteristic;
   processing the headset characteristic to determine a donned or doffed condition; and
   locking one or more user input devices upon determination of a doffed condition, wherein locking one or more user input devices comprises ignoring a command received from a locked user input device.

10. The method of claim 9, wherein the one or more user input devices comprise a button or key.

11. A headset comprising:
- a detector means for providing an output indicating a donned or doffed condition;
- a memory means;
- a battery powered display means for displaying information;
- a display control means for enabling or disabling the battery powered display means responsive to the output indicating the donned or doffed condition; and
- a user input means for receiving user actions; and
- a user input control means for locking or unlocking the user input means responsive to the output indicating the donned or doffed condition wherein locking the user input means comprises ignoring a command received from the user input means; and
- a processing means for controlling headset operations.

12. The headset of claim 11, wherein the detector means comprises a motion detecting means for detecting headset movement.

13. The headset of claim 11, wherein the battery powered display means is powered off upon detection of a donned condition.

14. The headset of claim 11, wherein the user input means is locked upon detection of a doffed condition.

* * * * *